US011980282B1

(12) United States Patent
Elfenbein

(10) Patent No.: US 11,980,282 B1
(45) Date of Patent: May 14, 2024

(54) FULLY ADJUSTABLE PERSONAL REACH-EXTENDING DEVICE FOR MANUAL SCRATCHING, CLEANSING AND SHAVING

(71) Applicant: Michael Elfenbein, Parsippany, NJ (US)

(72) Inventor: Michael Elfenbein, Parsippany, NJ (US)

( * ) Notice: Subject to any disclaimer, the term of this patent is extended or adjusted under 35 U.S.C. 154(b) by 922 days.

(21) Appl. No.: 16/392,052

(22) Filed: Apr. 23, 2019

Related U.S. Application Data

(60) Provisional application No. 62/661,429, filed on Apr. 23, 2018.

(51) Int. Cl.
*A46B 5/00* (2006.01)
*A47K 7/02* (2006.01)
*A61H 7/00* (2006.01)

(52) U.S. Cl.
CPC ............ *A46B 5/0095* (2013.01); *A47K 7/028* (2013.01); *A61H 7/003* (2013.01); *A47K 7/022* (2013.01); *A61H 2201/1253* (2013.01); *A61H 2205/081* (2013.01)

(58) Field of Classification Search
CPC ... A46B 5/0095; A46B 5/0087; A46B 5/0083; A46B 5/0079; A46B 5/0075; A46B 5/0016; A46B 5/0029; A46B 5/0054; A46B 5/0058; A46B 5/0062; A46B 5/0066; A46B 7/044; A46B 7/042; A46B 7/04; A46B 15/0075; A46B 3/22; A46B 3/005; A46B 3/20; A46B 2200/102; A46B 1/00; A46B 5/0008; A47K 7/028; A47K 7/022; A47K 7/043; A61H 7/003; A61H 7/002; A61H 7/001; A61H 2201/1253; A61H 2205/081; A61H 15/0092; B25G 3/12; B25G 3/18
See application file for complete search history.

(56) References Cited

U.S. PATENT DOCUMENTS

| | | | | | |
|---|---|---|---|---|---|
| 869,250 | A | | 10/1907 | Martin | |
| 2,168,975 | A | | 4/1939 | Clarke | |
| 2,414,321 | A | | 1/1947 | Miller | |
| 3,924,329 | A | * | 12/1975 | Carter | B25G 3/18 30/342 |
| 5,020,182 | A | * | 6/1991 | Engel | A46B 15/0075 401/268 |

(Continued)

*Primary Examiner* — Joseph D. Boecker
*Assistant Examiner* — Brian T Khong
(74) *Attorney, Agent, or Firm* — Benjamin Appelbaum

(57) ABSTRACT

An adjustable reach-extending device for manual scratching, cleansing, and shaving comprises a handle, a flexible wand and a detachable head which can be a personal care device. The wand is flexible, and designed to retain the position into which it is formed. The wand terminates in a connector, which connector is designed to receive a complementary end (plug) of the detachable head. A spring-release button within the connector enables the personal care device to be detached from the wand. The personal care device can be a scratching device, a brush, a mirror, a sponge or a razor. The scratching device comprises a plurality of bristles that are attached to a base. The bristles vary in length from short to long, differ in their hardness, whether or not they are mounted in the base at an angle, and the materials from which they are manufactured.

14 Claims, 17 Drawing Sheets

(56) References Cited

U.S. PATENT DOCUMENTS

| | | | | |
|---|---|---|---|---|
| 5,224,234 | A * | 7/1993 | Arsenault | A46B 5/0033 15/176.1 |
| 5,875,512 | A | 3/1999 | Lathan | |
| 5,904,661 | A | 5/1999 | Bonz | |
| 6,221,034 | B1 | 4/2001 | Chaplin | |
| 6,272,716 | B1 | 8/2001 | Thornton | |
| 6,981,292 | B1 | 1/2006 | Steinberg | |
| 7,530,138 | B1 | 5/2009 | Platt | |
| 7,784,141 | B2 | 8/2010 | Knopow | |
| 8,197,149 | B2 | 6/2012 | Darrow | |
| 9,198,196 | B2 | 10/2015 | Dagan | |
| 9,351,613 | B1 | 5/2016 | Tacoma | |
| 2003/0046780 | A1 * | 3/2003 | Davis | A46B 9/045 15/176.1 |
| 2006/0272113 | A1 * | 12/2006 | Cato | A46B 9/025 15/167.1 |
| 2007/0093736 | A1 | 4/2007 | Hebert | |
| 2009/0093743 | A1 | 4/2009 | Corzine | |
| 2010/0107348 | A1 * | 5/2010 | Steedley | A47K 7/022 15/144.1 |
| 2012/0167322 | A1 | 7/2012 | Jaworski | |
| 2018/0317640 | A1 * | 11/2018 | Schär | B29C 45/2626 |

* cited by examiner

Disconnected

Connected

Section View

Side View

Section View

Side View

FULLY ADJUSTABLE PERSONAL REACH-EXTENDING DEVICE FOR MANUAL SCRATCHING, CLEANSING AND SHAVING

CROSS-REFERENCE TO RELATED APPLICATIONS

This application claims the benefit of U.S. Patent Application Ser. No. 62/661429, filed 23 Apr. 2018, by the present inventor, and whose contents are incorporated by reference herein in their entirety.

FIELD OF THE INVENTION

This application relates to a personal care device that facilitates reaching difficult to reach body locations, especially for a person who has difficulty or disability, obesity, discomfort, etc.

BACKGROUND-PRIOR ART

I frequently had an itch on my back where some hair is growing, usually while lying in bed, and couldn't reach it. I would look for a product using an Internet web search and couldn't find anything that wasn't some sort of scraping claw on a rigid stick. I couldn't find anything bendable/flexible, or anything with an effective scratch head that could effectively soothe an itch. Everything I found would only abrasively scrape the skin—which winds up making the itch even worse.

I remember my parents having the only type of back-scratcher they could find, and my father, a rotund man, wasn't even able to get his arm back far enough to use it to scratch his back. He had to instead stand up and rub up against a tall book shelf.

I realized that the only way to get a proper solution to reaching and curing that itch was to invent something myself. The key was something that a user can bend into any angle, something long enough for any sized person with any degree of flexibility to employ, and something that has a scratching element that can more effectively mitigate an itch.

As I was designing the concept, I realized that such a device can have many other uses to solve other hard to reach on the body problems. Thus, it would be ideal to have interchangeable heads on the device for other uses. I realized there were many other reasons for a device to get at hard to reach areas of the body, particularly for people who have limited flexibility or reach. Some examples I imagined were those for bathing, for applying lotions/medicines, for wiping, for viewing, and for shaving. Thus, the product should be more versatile and allow interchangeable components, such as easy snap on and snap off heads like a sponge, a claw, a mirror, a razor, etc. Having detachable heads will allow an unlimited variety, and shapes of elements to be further designed and evolved for use on the same device without having to buy a whole new product.

Among the products existing on the market, I did not find one I considered satisfactory for my purposes, which spawned my idea to develop my own special scratcher. If I could not find a satisfactory product on the market, maybe that points to an entire niche in this personal care market.

BRIEF SUMMARY OF THE INVENTION

In accordance with one embodiment of the present invention, and there are conceivably many others, this reach extending device comprises a handle, a bendable and/or flexible wand extension, and a quick connect, removable "head" used to scratch, scrape, wipe, swab, view, etc. One embodiment of the present invention is a multi-functional personal care device, that comprises a handle; a personal care attachment; and a flexible connecting member attached to the handle at one end of the connecting member, and the second end of the connecting member terminating in a means for releasably fastening the connecting member to the personal care attachment.

BRIEF DESCRIPTION OF THE SEVERAL VIEWS OF THE DRAWING

FIGS. 4*a* and 4*b* show detail views of one embodiment of a push to connect, detachable connection that also provides a fixed alignment between the Connector and the Detachable Head; in which FIG. 4*a* shows the head and the connector when the head has been removed from the connector (detached) and FIG. 4*b* shows the head positioned within the connector (attached).

Figure 1:
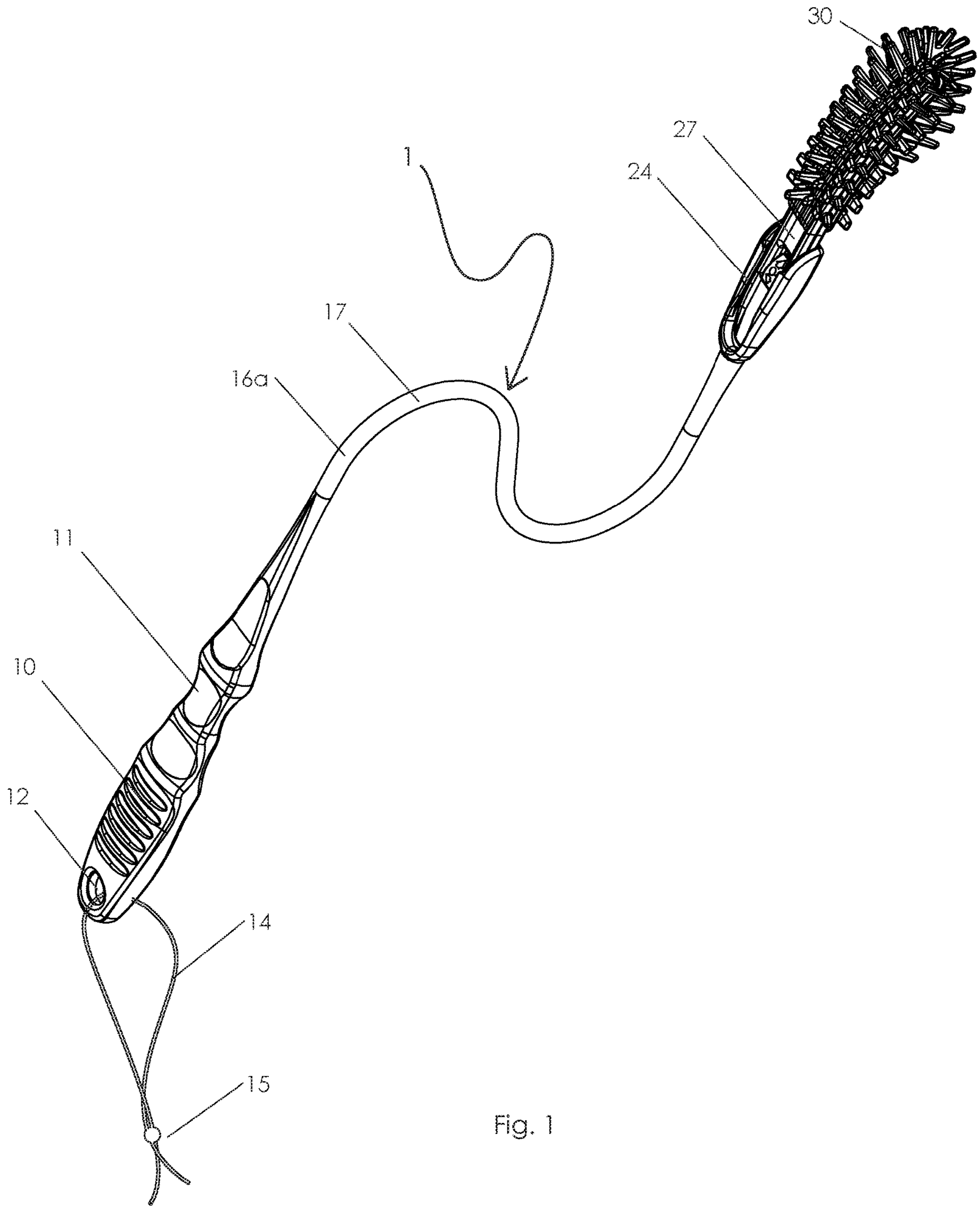
FIG. 1 shows a first embodiment of the reach extending device with a flexible wand shown as a bendable material that can be bent and repositioned at random angles in any location along the flexible wand portion.
Figure 1A:
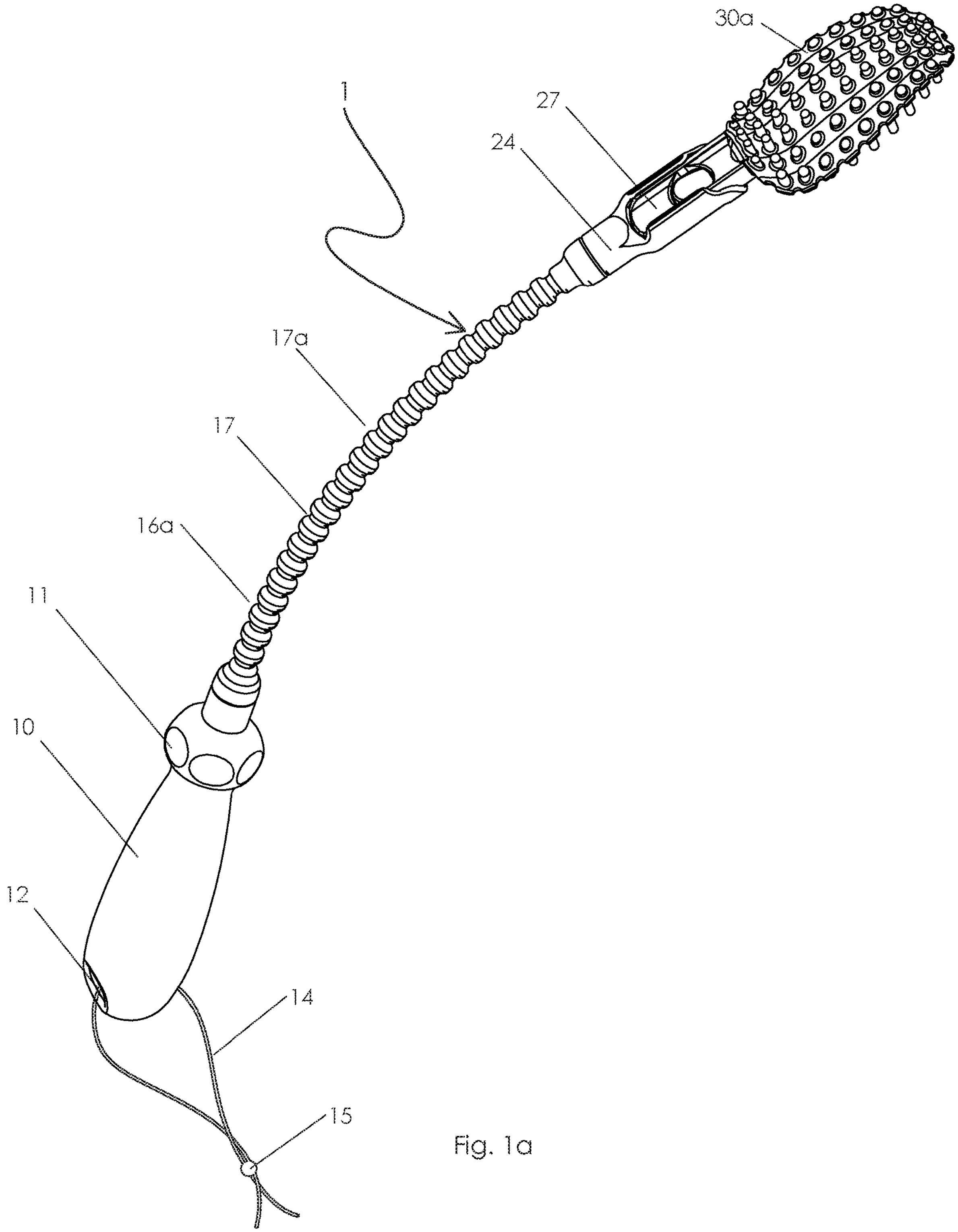
FIG. 1*a* shows a second embodiment incorporating a flexible wand with a corrugated sheath around the core of bendable material.
Figure 1B:
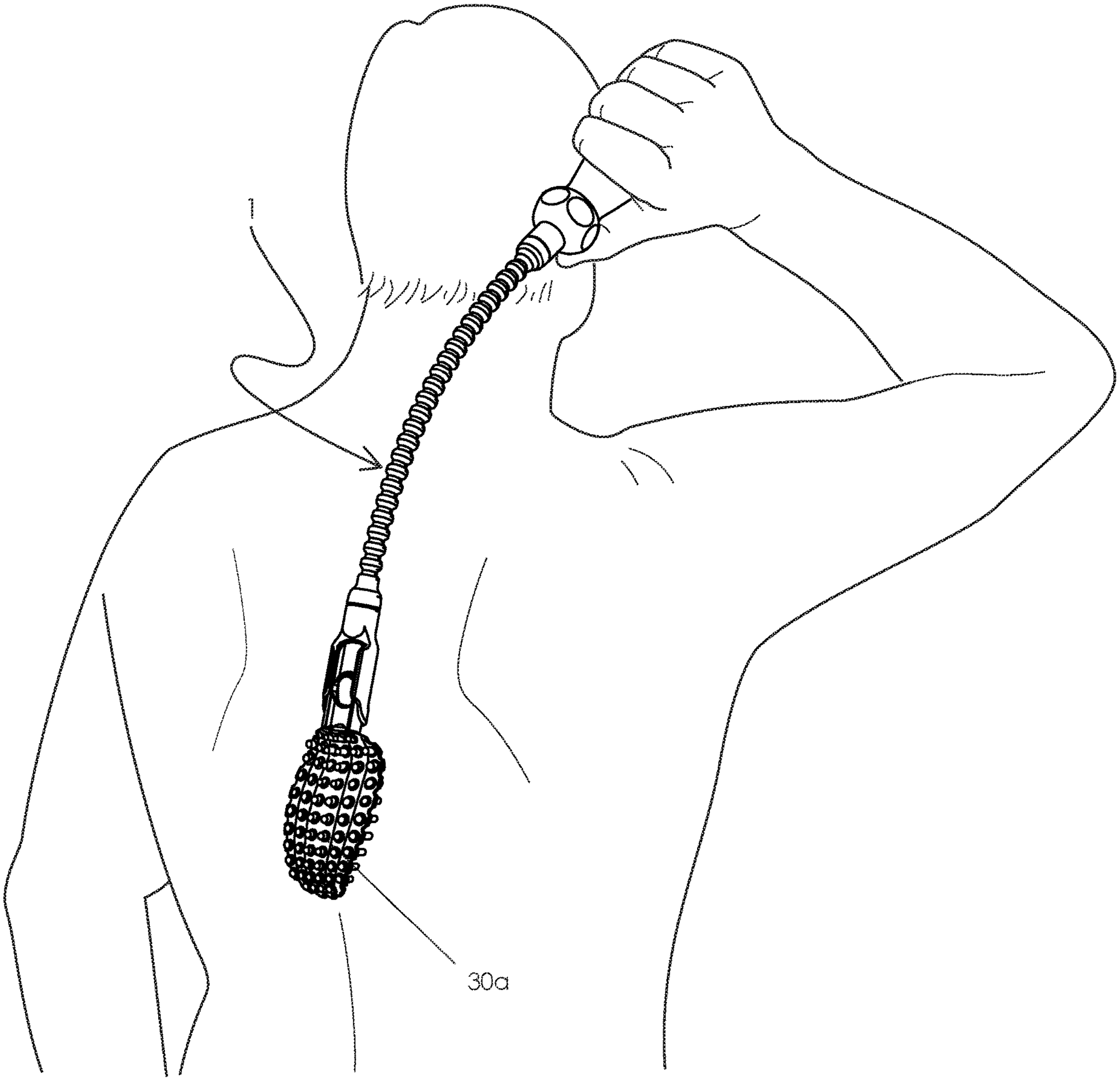
FIG. 1*b* shows the embodiment of FIG. 1*a* being held in a position to scratch the back of a user.

REFERENCE NUMERALS *Note: I have deliberately used several interchangeable terms throughout the specification to describe these components, in order to introduce like terms for the purpose of choice in this document, and for the broadness of analogy in referring to the same thing in several different terms.

1 Scratching Device
10 Handle
11 Flattened Grip Surface
12 Hang Hole
13 Hang Hook
14 Lanyard
15 Lanyard Keeper
16 Flexible or Bendable Connector (Wand)(several embodiments shown)
  16*a* flexible/positionable wand—Shown as a bendable material.
  16*b* flexible/bendable wand—Shown as a ball and socket assembly.
  16*c* Bendable/positionable wand—Shown as an assembly of detented pivoting segments.
17 Wire with Plastic Sheathing
17*a* Corrugated Sheath
18 Ball and Socket Segment
19 Ball
20 Socket
21 Pivoting Segment
22 Notched Disc
23 Toothed Jaw
23*a* Toothed Jaw Walls
23*b* Toothed Jaw Teeth
24 Connector
25 Female Receptacle (to fit Male Plug Rails)
26 Release Button (including some kind of spring element)
27 Detachable Head Plug (for the different Detachable Heads)
  27*a* Plug with features for the Alternating Bristle Assembly
  27*b* Plug with features for holding Rounded Bristles
  27*c* Plug with Alligator Clip Assembly features
  27*d* Plug with Mirror Assembly features
  27*e* Plug with Razor Assembly features
28 Male Plug Rails
29 Lock Hole (for Release Button catch)
30 Scratching Attachment with Alternating Bristle Configuration
30*a* Scratching Attachment with Alternating Bristle Configuration, molded as one part with dual material construction
31 Harder Bristles (also possibly shorter)
32 Softer Bristles (also possibly longer)
33 Scratching Attachment with Rounded Bristles
33*a* Scratching Attachment with longer bristle configuration, molded as one material construction
34 Alligator Clip Assembly (one of many ways of attaching alternate bristles or other surfaces and applicators)
35 Fixed Clip Jaw
35*a* Frame extension
36 Articulating Clip Jaw
37 Clip Lever
38 Clip Spring
39 Scratching Brush Configuration made of flexible material (shown as flat part that has been folded)
40 Bristles with various lengths and thicknesses
40*a* Base
40*b* Base ends
41 Absorbent Swab (shown as flat part that has been folded)
42 Sponge
43 Mirror
44 Razor Assembly
44*a* Alternate embodiment of Razor Assembly
45 Razor Body
46 Cartridge Holder
46*a* Razor Cartridge Release Button
47 Cartridge Clamp
47*a* Central Axis Pivot
48 Razor Cartridge
50 Sidewalls
52 Arcuate end
54 Internal Extension
60 Plug ends
80 Base
82 Straight long bristle
84 Bristle tip
90 Base
92 Bump
94 Short bristle

DETAILED DESCRIPTION OF THE INVENTION

Figure 2:
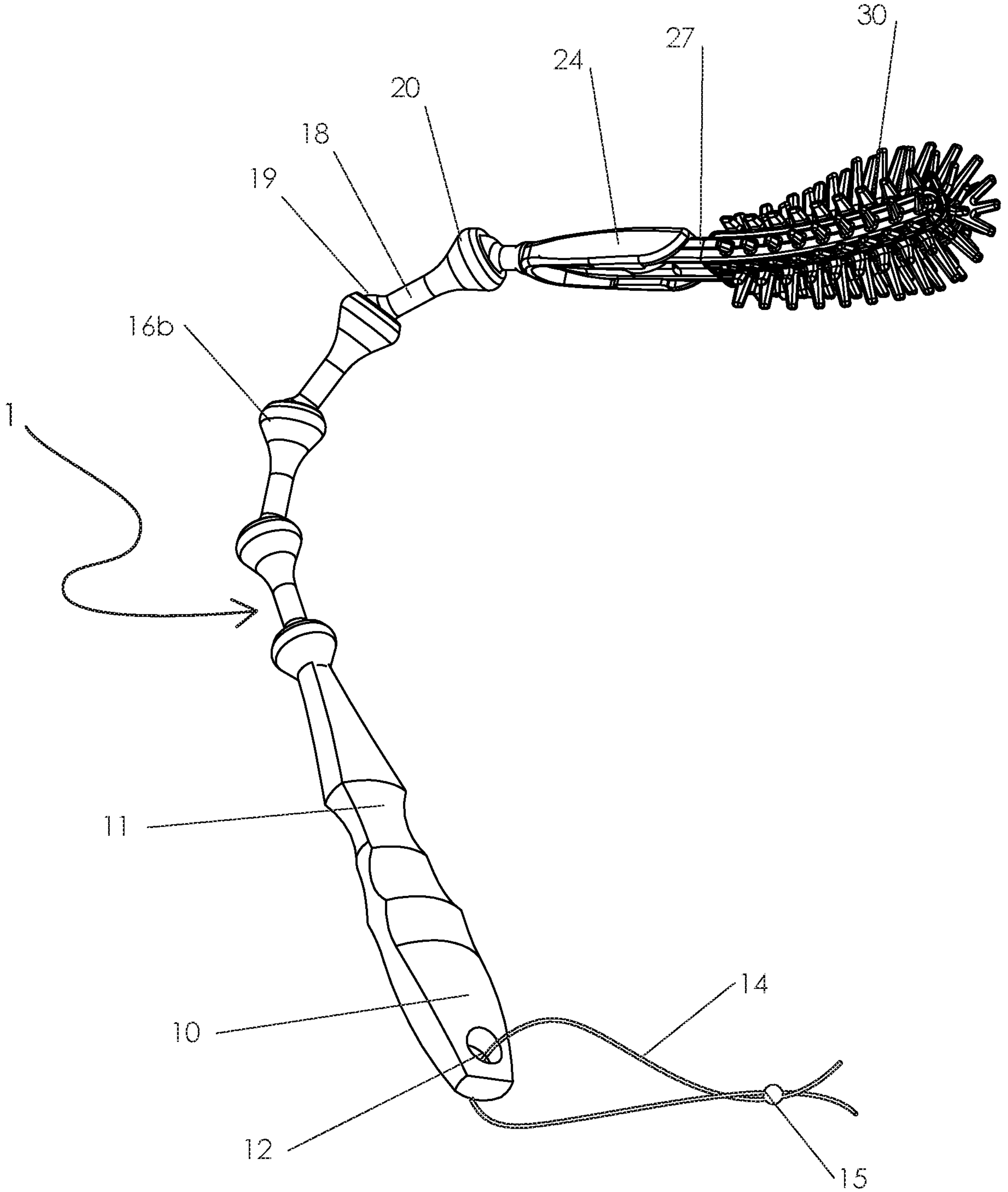
FIG. 2 shows a second embodiment of the reach extending device with a flexible wand shown as a ball and socket assembly that can be bent and repositioned at random angles at each joint.
Figure 3:
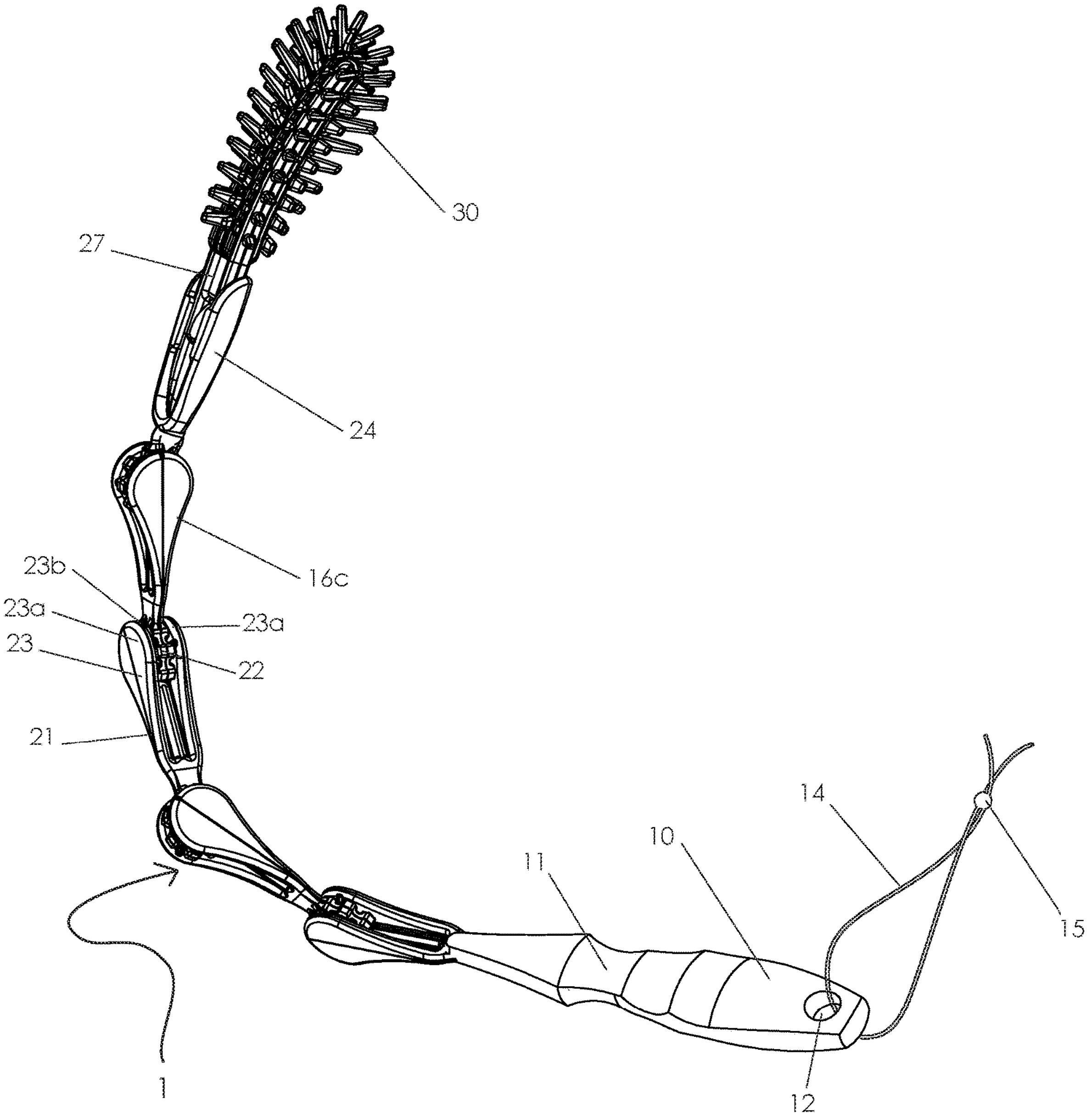
FIG. 3 shows a third embodiment of the reach extending device with a flexible wand shown as an assembly of pivoting segments with detents that enable the wand to be bent and repositioned at specific angles at fixed positions at each joint.

FIGS. 1, 2 and 3—COMMON ELEMENTS OF FIRST, SECOND and THIRD EMBODIMENTS (HANDLE DESCRIPTION)

Embodiments of the present invention of a fully adjustable personal or patient reach-extending device for personal care functions such as manual scratching, cleansing, and shaving is shown as reference numeral 1 in FIGS. 1, 1*a*-1*b*, 2 and 3. As shown in the Figures, reach-extending device 1 includes a handle 10, a flexible connector (wand) 16 and a head 30. The handle 10 is made of a durable and washable material, and may include soft portions made from materials such as silicone rubber or polyurethane. Handle 10 is shaped to include a flattened grip surface 11. One or more additional grip surfaces 11 could be positioned elsewhere on the handle, in this or in other embodiments. The handle is constructed such that its' orientation acts as a guide for the user to align the working surface of the head with the handle prior to use (see alignment and direction of use shown in FIG. 1*b*). In an embodiment, the handle 10 may be nominally 4-6 inches in length and approximately ½to 2 inches in depth and/or width; other embodiments may utilize a longer length handle, or wider width, such as to accommodate persons with large hands The material and shape are not limited to silicone rubber or the contour illustrated, but these comprise one of many possible embodiments. Plastics such as nylon, polyethylene, or polycarbonate, polystyrene or combinations thereof could also be used to manufacture the handle. Additionally, one or metals, such as aluminum, woods, or other composite materials could be used to manufacture the handle, dependent upon cost and manufacturing considerations.

Handle 10 includes an opening 12 (or Hang Hole 12) through which a Lanyard 14 is attached to the Handle 10 and anchored by a Lanyard Keeper 15. The Lanyard comprises flexible strand(s) or fiber(s) such as rope, leather, plastic, metal or other braided material of sufficient length, strength and flexibility to support the entire apparatus of FIG. 1 for storage on a hook or bedpost. In like manner, the Lanyard Keeper 15 comprises a plastic or metal bead, adjustable or non-adjustable, to anchor the ends of the Lanyard 14. The Lanyard Keeper 15 may also comprise a knot. The handle 10 may also incorporate a Hang Hook 13 (not shown) for hanging the device. The hang hook may be a metal hook, and attached to the handle by means of an adhesive or a fastener such as a screw or the like, or may instead comprise a groove cut into the bottom surface of the handle into which a fastener's top, such as a nail head, screw head shower hook or the like, could be received, such that the device 1 could be suspended on a wall or other surface.

A connector 16 is attached to the Handle 10 and connects the handle 10 with the head 30 or other attachment. The connector 16 will also be referred to as flexible, bendable wand 16 (including embodiments 16*a*, 16*b* and 16*c*) that in one embodiment, may be nominally 10-24 inches in length, or other length in alternate embodiments. Embodiments 16*a*, 16*b* and 16*c* or other alternate embodiments allow flexible bending of the wand, yet with sufficient resistance and rigidity to stay in place and retain a particular position, so that once the wand 16 is bent into shape, to provide positive operation of the reach-extending device 1 of the present invention for shaving, scratching, viewing, cleansing, etc.. The flexible wand 16 (including embodiments 16*a*, 16*b* and 16*c*) comprises a material that is suitable for durable use in wet or humid conditions, such as a shower or bath, and subsequent disinfection, and includes a finish that is sufficiently resistant to such environments. The width or diameter of wand 16 (including embodiments 16*a*, 16*b* and 16*c*) is a factor in determining the rigidity of the wand, and in embodiments, is nominally ¼" to 1" in outer diameter.

FIG. 1—FIRST EMBODIMENT—WAND 16*a* DESCRIPTION

Embodiment 16*a* for the Flexible/Positionable Wand comprises a bendable metal wire, group of wires, or a cable housed inside a soft or flexible plastic or rubber sheathing (or tubing) 17, that can be bent and repositioned at random angles in any location along the flexible portion of the wand. A cable manufactured from a plastic or composite could also be used as the wire component of the wand 16. The inner flexible metal of Embodiment 16*a* inside the plastic sheathing or tube 17*a* may also comprise a corrugated tube (see FIG. 1*a*) with a series of parallel ribs such similar in form to flexible tubing used to carry fuel for hookup on natural gas and propane appliances, or have a structure such as a plurality of balls or spheres mounted around a central wire. In other embodiments, the wand can include a plastically deformable material that can be formed or bent into a given shape and remain in that shape without appreciable spring-back. Such materials can include aluminum, copper, steel and other metals of suitable composition, ductility, heat treatment and the like. The wand 16 may be made from other known metal and non-metal components that can be formed or bent into a given shape and remain in that shape without appreciable spring-back.

FIG. 2—SECOND EMBODIMENT—WAND 16*b* DESCRIPTION

Embodiment 16*b* for the Flexible/Bendable Wand comprises a series of consecutive ball and socket joint segments 18, each including one Ball 19 and one Socket 20 located at opposing ends. Each ball 19 and each socket 20 are sized such that there is sufficient friction in each joint to hold randomly positioned angles according to an amount of force specified to maintain the distal location of the Detachable Head Plug 27. Where necessary for additional strength or rigidity, the ball and socket construction of embodiment 16*b* could be supplemented by or combined with the flexible inner metal or other material used in the connector 16 described for the prior embodiment of the device 1. The number of ball and socket joint segments 18 shown in FIG. 2 is for illustrative purposes only, the actual number will depend upon the desired length of the particular embodiment.

FIG. 3—THIRD EMBODIMENT—WAND 16*c* DESCRIPTION

Embodiment 16*c* for the Bendable/Positionable Wand is a series of Pivoting Segments 21 each segment 21 comprising a pair of walls 23*a* between which walls is positioned a Notched Disc 22 at a first end of the segment 21 and a Toothed Jaw 23 at the second end of the segment 21, in which the disc 22 of the first segment 21 receives the toothed jaw 23 of a second segment 21, forming an assembly 16*c* of detented Pivoting Segments 21 which provides adjustable specific angled positions that can temporarily lock and unlock from fixed positions using a specific amount of exertion toward bending the wand. The rotation of the discs 22 enables the wand 16*c* to be positioned at the various angles needed. Although not shown in the drawings, each disc includes either an axle as a pivot pin formed by the material, or a central opening through which a pivot pin is inserted, and which pivot pin is retained in position by a receptacle on the inside surface of each wall 23*a*. In other embodiments, such an axle could be formed during the manufacturing process, and be a part of the wall, or be molded as a part of the disc, or be inserted as a separate unit and retained by a press-fit between the walls.

Figures 4, 4A, 4B:
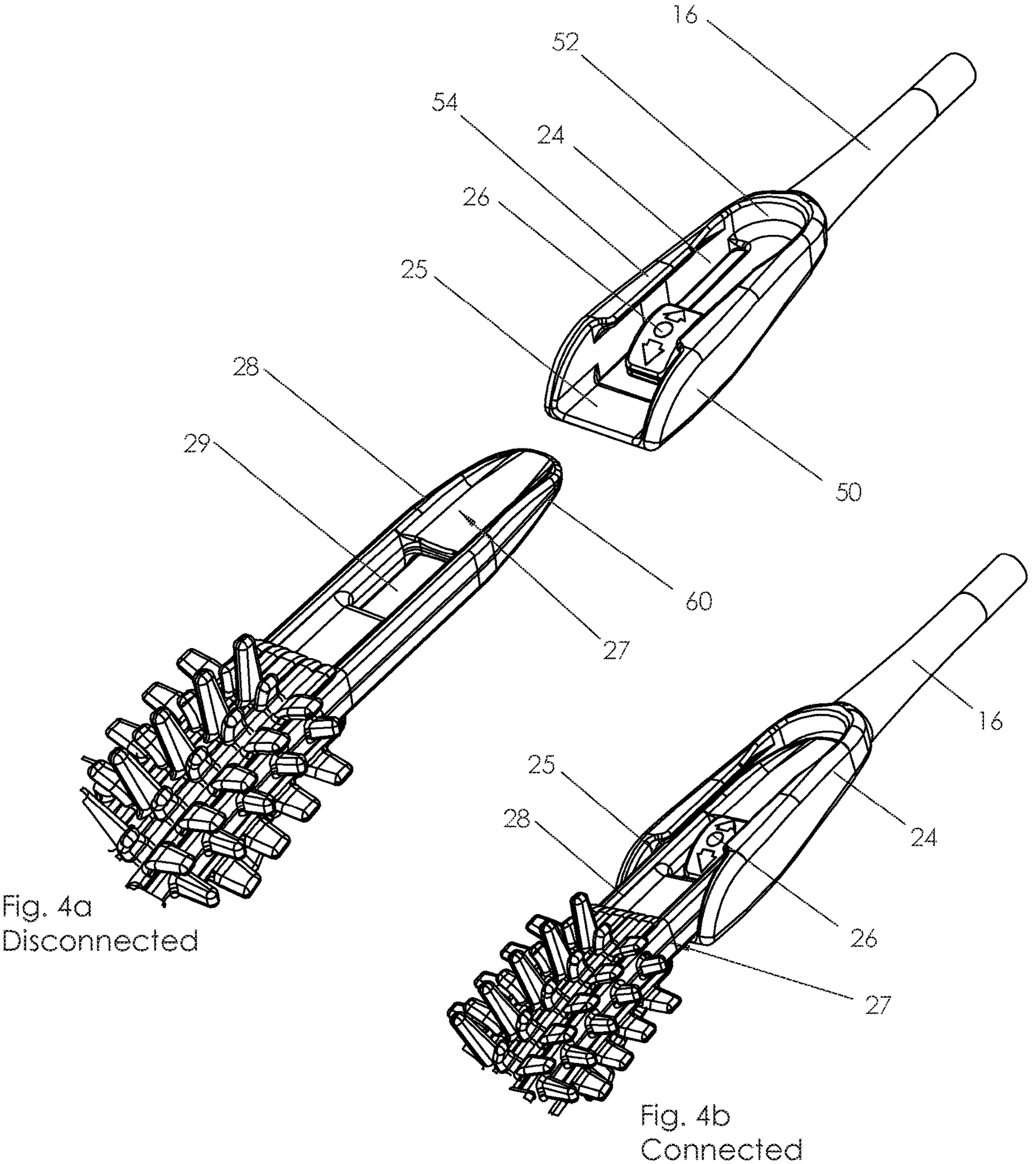

FIG. 4—DETACHABLE CONNECTION (includes Detachable Head Male Fitting and Connector)

For the remainder of this specification, wand embodiments 16*a*, 16*b*, and 16*c*, will be referred to as wand 16. Attached to the end of wand 16 opposite the handle 10 is Connector 24. Connector 24 allows a Detachable Head Plug 27 to be attached to or detached from the end of the wand 16 for use, removal or change of head 30.

For purposes of this specification, the end of the wand 16 attached to handle 10 is to be referred to as the proximal end, and the end of the wand near where the head will attach is to be referred to as the distal end.

Wand 16 enables an operator to reach remote or difficult-to-reach places with Detachable Head Plug 27. A multitude of embodiments are conceivable for the Detachable Head. Several embodiments of these detachable heads are described in this specification, and related variants and the equivalents thereof are considered to be within the scope of this invention, as will be described in the claims.

The Detachable Head Plug 27 is the main working element of the present invention and is shown as a Scratching Attachment with Alternating Bristles 30 in the first three embodiments shown in FIGS. 1, 2 and 3, and further described in FIG. 5. All the parts described up to this point serve the purpose of facilitating an operator, to exert a force or movement, spread an ointment, scratch an itch, shave, or view, or claw at or swab or disinfect or perform any other such procedure for which the Detachable Head Plug 27 is specifically designed.

The interaction between the head and the wand 16 is shown in FIG. 4, in the attached (FIG. 4*b*) and detached (FIG. 4*a*) positions.

FIG. 4*a* shows a Female Receptacle 25 of a shape and dimension to receive the Detachable Head Plug 27.

It is this matching geometry that provides the fixed alignment and anti-rotation characteristics so the Detachable Head Plug 27 or other attachment will not turn or spin on the end of the wand 16 when in use.

The distal end of wand 16 terminates in a hollow female receptacle 25 which includes a spring-loaded release button 26 therein and which is attached to base 25*a*. The base 25*a* includes an opening (not shown) through which release button 26 extends so it is accessible to a user. The receptacle 25 includes a connector 24 having a pair of sidewalls 50 and an arcuate end 52 which serves as a stop point when the plug is inserted. The connector sidewalls each include an internal extension 54 that extend over the base 25*a* and under which extensions 54 the plug rails 28 pass when the plug 27 is received in the receptacle 25.

Each attachment to be used with embodiments of the present invention includes a head plug 27 having a shape that is complementary to that of the connector 24. Head plug 27 is generally rectangular (when viewed in cross section) and includes an opening (lock hole) 29 which will receive release button 26 when the plug is received within receptacle 25. As seen in FIG. 4*a*, the plug end 60 is tapered, enabling the plug to slide into receptacle 25. The upper part of the plug end 60 form rails 28 which aid in guiding the plug beneath the internal extensions 54 into the receptacle 25.

In order to detachably anchor Detachable Head Plug 27 onto the Connector 24, a Release Button 26 is provided under force from an integrated spring element to engage a Lock Hole 29 when Male Plug Rails 28 are fully inserted into Female Receptacle 25. This geometric mating of rails and receptacle occurs when the Detachable Head Plug 27 is pressed into Connector 24. The fitting can be disconnected by pressing the Release Button 26 to release the connection, or the connection can be pulled apart with an amount of force enough to overcome both the shape of the button 26 and the stiffness of spring element in Release Button 26. Materials for the Connector 24, and Detachable Head Plug 27 should have sufficient strength and durability for the appropriate amount of force exerted using this invention. The size of the fitting is according to manufacturing needs and necessary material strengths, and be manipulated with the typical range of adult male and female hand sizes and strengths.

FIG. 5—SCRATCHING ATTACHMENT with Alternating Bristle Types

Figure 5B:
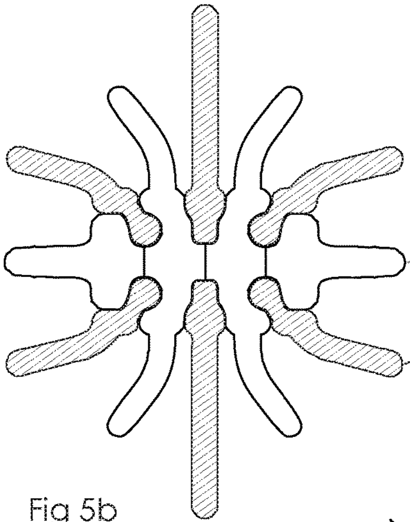
FIG. 5*b* is a cross-sectional view of the head shown in FIG. 5*a*, taken along line 5*b*—5*b*.
Figure 5A:
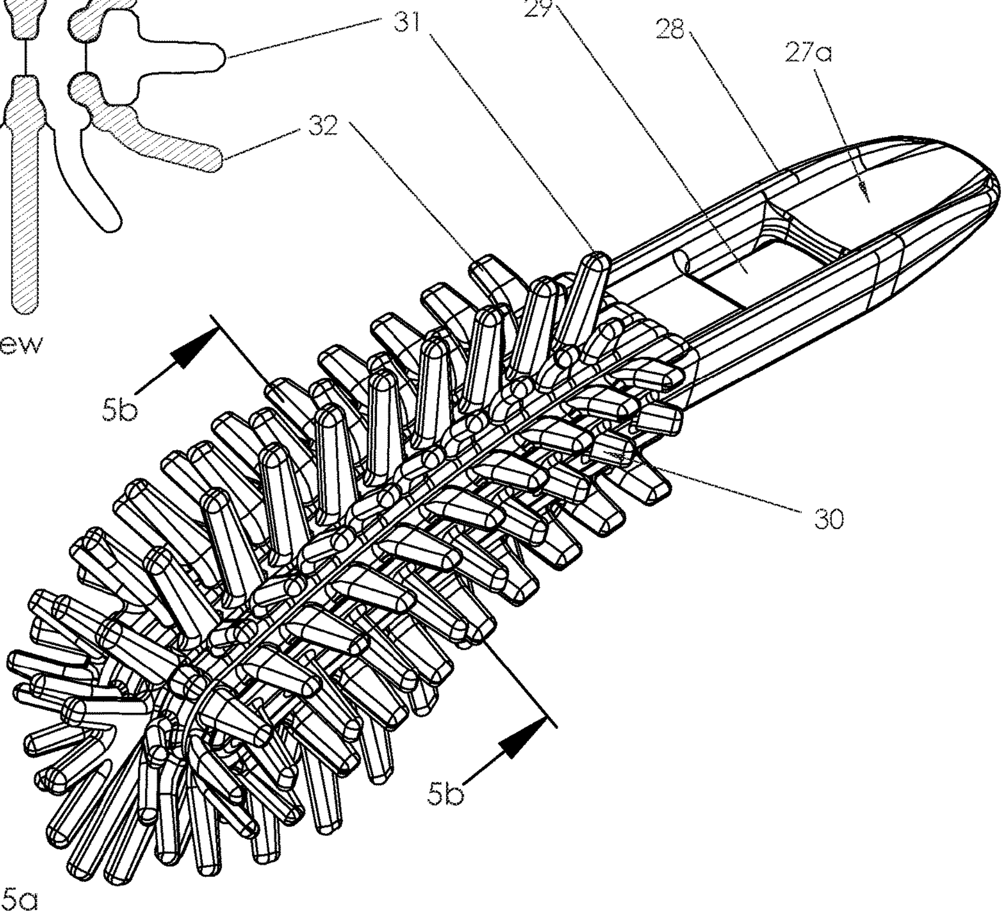
FIG. 5*a* shows a detachable head for a scratching attachment with a bristle arrangement comprising alternating bristle hardnesses, bristle density and/or differing bristle lengths.
Figure 5C:
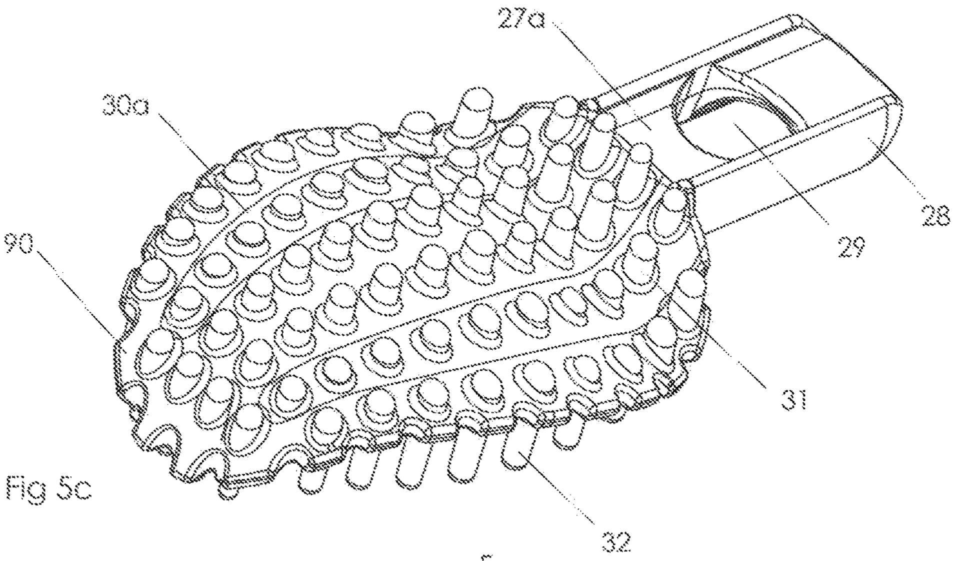
FIG. 5*c* shows an alternate brush embodiment, the bristle arrangement comprising bristles having alternating hardnesses, density and/or differing bristle lengths.
Figure 5D:
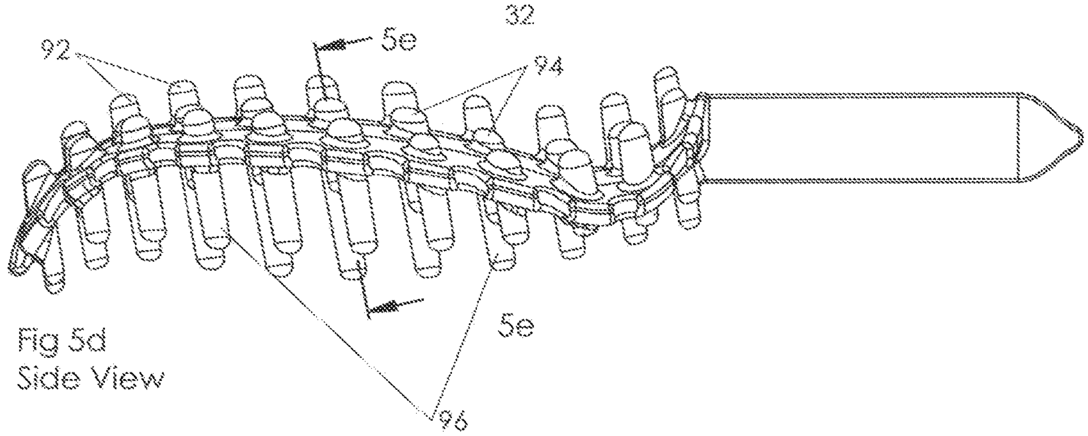
FIG. 5*d* is a side view of the embodiment shown in FIG. 5*c*. Note the appearance of the bristles as bumps on the upper side.
Figure 5E:
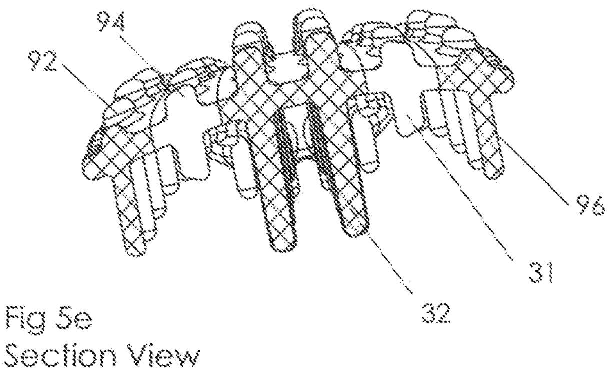
FIG. 5*e* is a cross-sectional view of the embodiment of FIG. 5*d*, taken along line 5*e*—5*e* of FIG. 5*d*. In this embodiment, the longer bristles are softer than the shorter, harder bristles.

FIGS. 5 and 5*c* are detail view of detachable heads showing two embodiments of a construction of a multiple force Scratching Attachment 30 or 30*a* of the first embodiments of this invention (FIGS. 1, 2 and 3).

Multiple force Scratching Attachments 30 and 30*a* are defined as follows: A row of one type of bristle 31 alternating with a row of a second type of bristle 32 in an alternating pattern, as shown in FIG. 5*b*. The first type of bristle 31 can be long, and the second type of bristle 32 shorter than the first type of bristle 31. The shorter bristles can be harder than the longer bristles, or in other embodiments softer than the longer bristles. A row of a harder and possibly shorter bristles 31 are shown incorporated next to rows of softer and possibly longer bristles 32, and so forth, repeating an alternating pattern being retained or held by the Plug 27*a*. The thickness and density of the bristles, of either or both types of bristles, can vary from that shown in FIGS. 5 and 5*c*, and may use one of many common construction methods of a brush. The softer bristles 32 can be longer in length than the harder bristle 31 so that the softer bristles are the first to contact the skin or other surface for the initial scratching experience. The difference in length between bristle 31 and 32 can be small, perhaps between 0.1 and 0.5 inches, while the overall length of any of the bristles might be less than 2 inches. The stiffness of the softer bristles 32 are less than the stiffness in the harder bristles 31, such that the longer bristles 32 (first in contact with skin) would bend more easily than the stiffer but shorter bristles 31. The variation in bristle stiffness and the overall Scratching Attachment construction are determined by factors common to brush manufacturing methods—as are the materials comprising the body of the brush and the bristles themselves.

The embodiment shown in FIG. 5 shows a scratching attachment 30, having a multiple piece assembly construction, in which the bristles have different hardnesses.

The embodiment shown in FIG. 5*c* (including FIGS. 5*d*-5*e*) shows an embodiment 30*a*, manufactured as one piece containing different materials. This embodiment also represents a two-sided configuration with bumps 92 or short bristles 94 on one side (FIG. 5*c*) of a base 90 and longer dual-length bristles 96 on the other side (see the side and sectional views shown in FIGS. 5*d*-5*e*, respectively). The base 90 comprises a flexible elastomeric material, for example, such as rubber.

All materials are appropriate for use on human skin, durable, washable and suitable for use in water. As with the other embodiments incorporating the features of Detachable Head Plug 27, Plug 27*a* is attached to the Connector 24 utilizing the Male Plug Rails 28 and Lock Hole 29.

Figure 6:
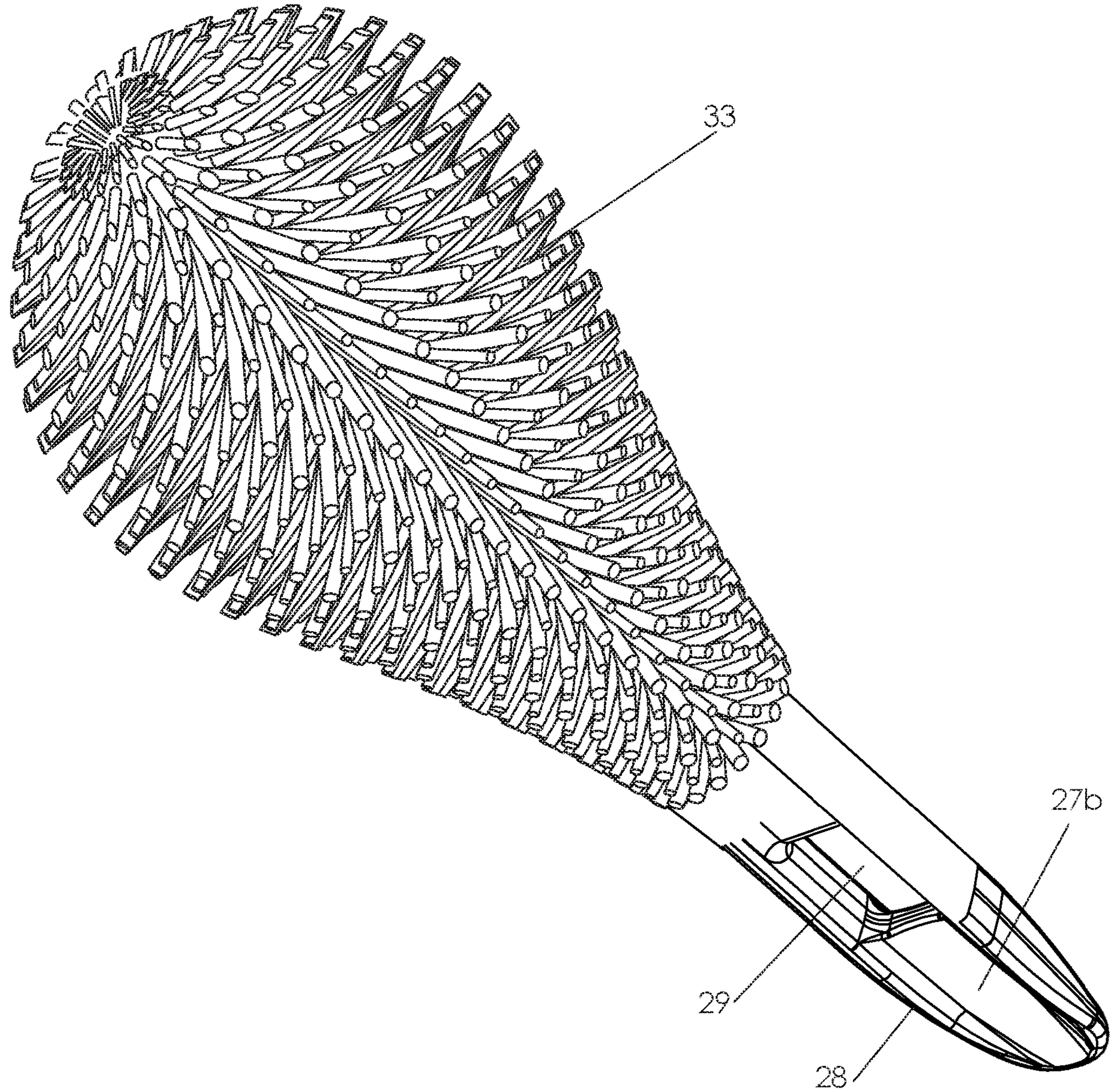
FIG. 6 shows an alternative embodiment of a scratching attachment with a rounded configuration and bristles that are uniformly shaped and/or positioned.

FIG. 6—SCRATCHING ATTACHMENT with ROUNDED BRISTLE CONFIGURATION

FIG. 6 shows a detachable head comprising an alternative embodiment of a Scratching Attachment with a rounded configuration 33, with bristles 70 that are curved, are uniformly shaped and positioned along a core 72, and which core terminates as Plug 27*b*. This embodiment illustrates one having a more uniform arrangement of the bristles 70 that could be manufactured using rotocasted plastic or assembled from multiple materials. As with the other embodiments incorporating the features of Detachable Head Plug 27, Plug 27*b* is attached to the Connector 24 utilizing the Male Plug Rails 28 and Lock Hole 29 to connect to the wand 16.

Figure 6A:
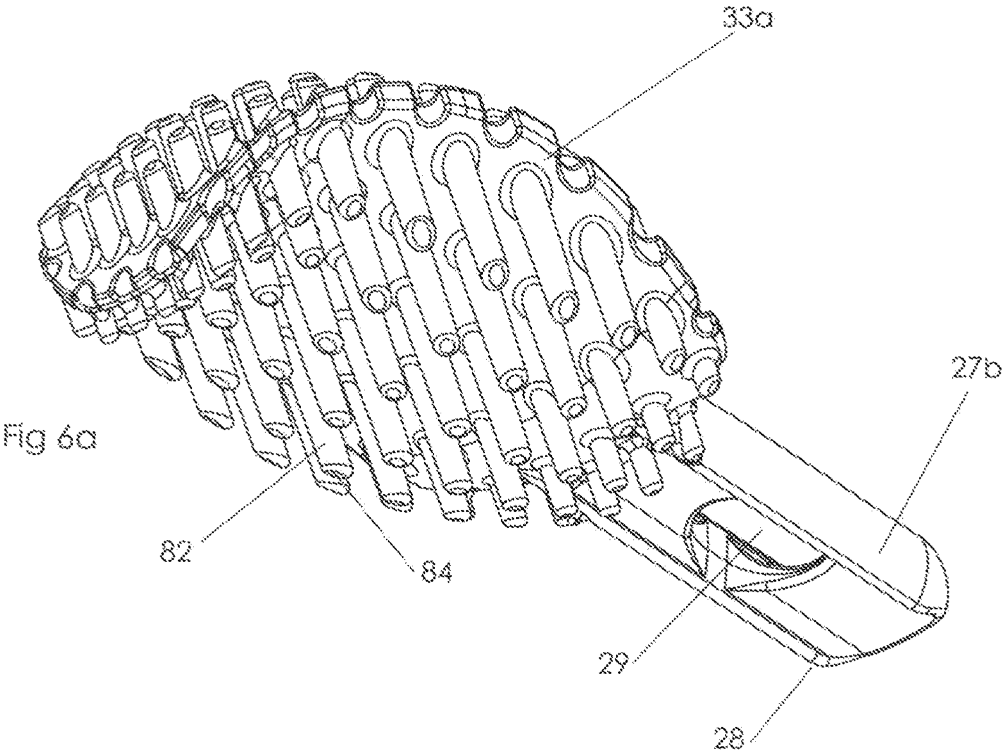
FIG. 6*a* shows another embodiment of the scratching attachment (head) that comprises long bristles, and molded as a single material construction.
Figure 6B:
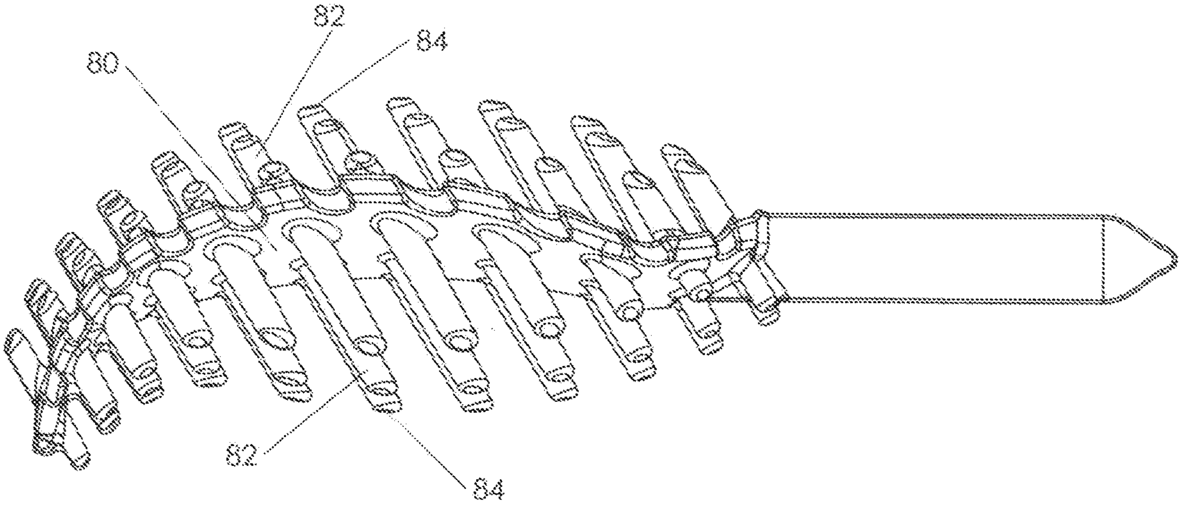
FIG. 6*b* is a side view of the embodiment shown in FIG. 6*a*. The bristles are positioned so they are angled with respect to the base, such that the ends of the bristles form a curved overall shape.

FIG. 6*a* —SCRATCHING ATTACHMENT with BRISTLE CONFIGURATION MADE OF ONE MATERIAL FIG. 6*a* shows a detachable head comprising an alternative embodiment of a Scratching Attachment with a one-piece configuration 33*a*. FIG. 6*b* is a side view showing a base 80 into which a plurality of straight long bristles 82 that may be positioned at a tilted angle in relation to the base 80. The bristle tips 84 are shown with ends to form a curved overall shape (FIGS. 6a-6b) connected to Plug 27b. This embodiment illustrates an embodiment of the invention that could be manufactured using rotocast or injection-molded materials. As with the other embodiments incorporating the features of Detachable Head Plug 27, Plug 27b is attached to the Connector 24 utilizing the Male Plug Rails 28 and Lock Hole 29.

FIG. 7—ALLIGATOR CLIP

Figure 7:
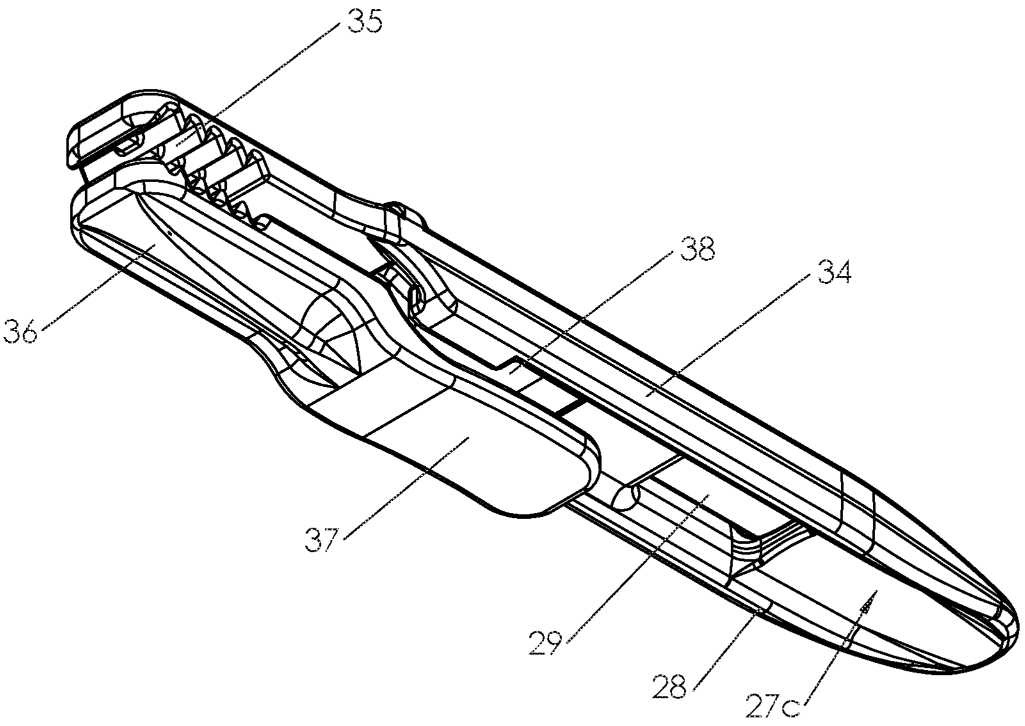
FIG. 7 shows a detachable head with one embodiment of an Alligator Clip assembly for holding a swab (not shown) or other removable or disposable materials.
Figure 7A:
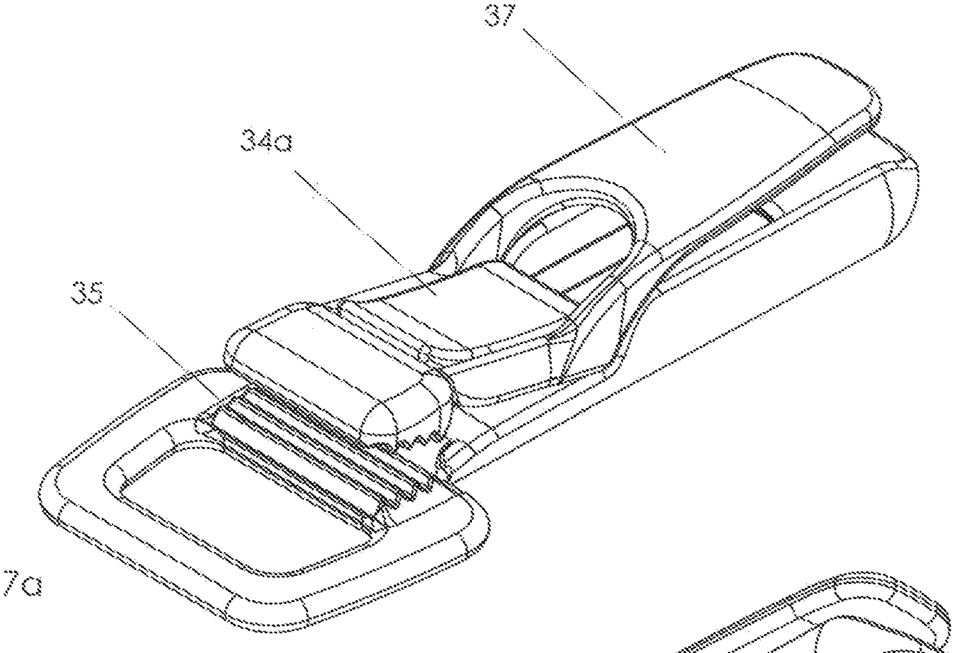
FIG. 7*a* shows a detachable head with another embodiment of Alligator Clip assembly including a frame-like form for supporting an item such as a swab (not shown) or a sponge (not shown).

FIGS. 7 and FIG. 7a show two embodiments of detachable heads as an Alligator Clip 34 with the Plug 27c incorporating a Fixed Clip Jaw 35 (FIG. 7) and Alligator Clip 34a using a Fixed Clip Jaw with Frame 35a (FIGS. 7a and FIG. 7b), and features for retaining a movable Articulating Clip Jaw 36, that is held in a closed position by a Clip Spring 38, and opened by pressing the Clip Lever 37. The Alligator Clip 34 is designed to hold various sized items, such as a small cloth, wipe, cotton ball or swab for ointment, salve, cleaner, disinfectant, or other removable or disposable materials between the spring loaded Fixed Clip Jaw 35 and the Articulating Clip Jaw 36. The Fixed Clip Jaw with Frame 35a provides a holding form for soft or flexible materials held in the clip. As with the other embodiments incorporating the features of Detachable Head Plug 27, Plug 27c is attached to the Connector 24 utilizing the Male Plug Rails 28 and Lock Hole 29. Although two embodiments of the Alligator Clip 34 are shown in the drawings, other versions could offer differently shaped and sized jaw configurations, and such versions and their equivalents are considered parts of the present invention, as described in the claims.

Figure 8:
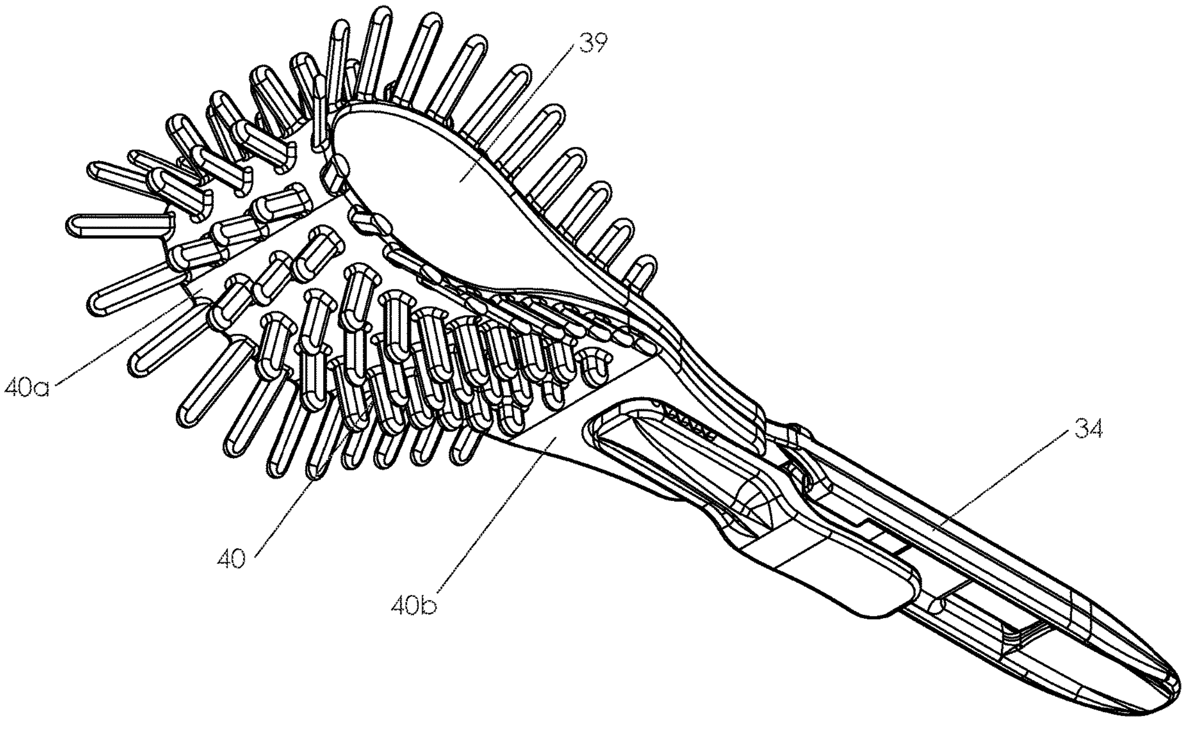
FIG. 8 shows the Alligator Clip assembly shown in FIG. 7, holding an alternative embodiment of a scratching brush.

FIG. 8—ALLIGATOR CLIP with a SCRATCHING BRUSH CONFIGURATION

FIG. 8 illustrates the Alligator Clip 34 shown in FIG. 7 holding an alternate Scratching Brush Configuration 39 made of flexible material. The bristles 40 are attached to a base 40a that terminates in ends 40b. For use, the base 40a is folded, and the ends 40b inserted into clip assembly 34. Different embodiments could include broad coverage brushes, one with flat brushing surface, one with rounded surface contour or multiple bristle configurations on the same strip of material. The Scratching Brush Configuration 39 can be released from the Alligator Clip for cleaning or replacement by pressing the Clip Lever 37.

Figures 9, 9A, 9B:
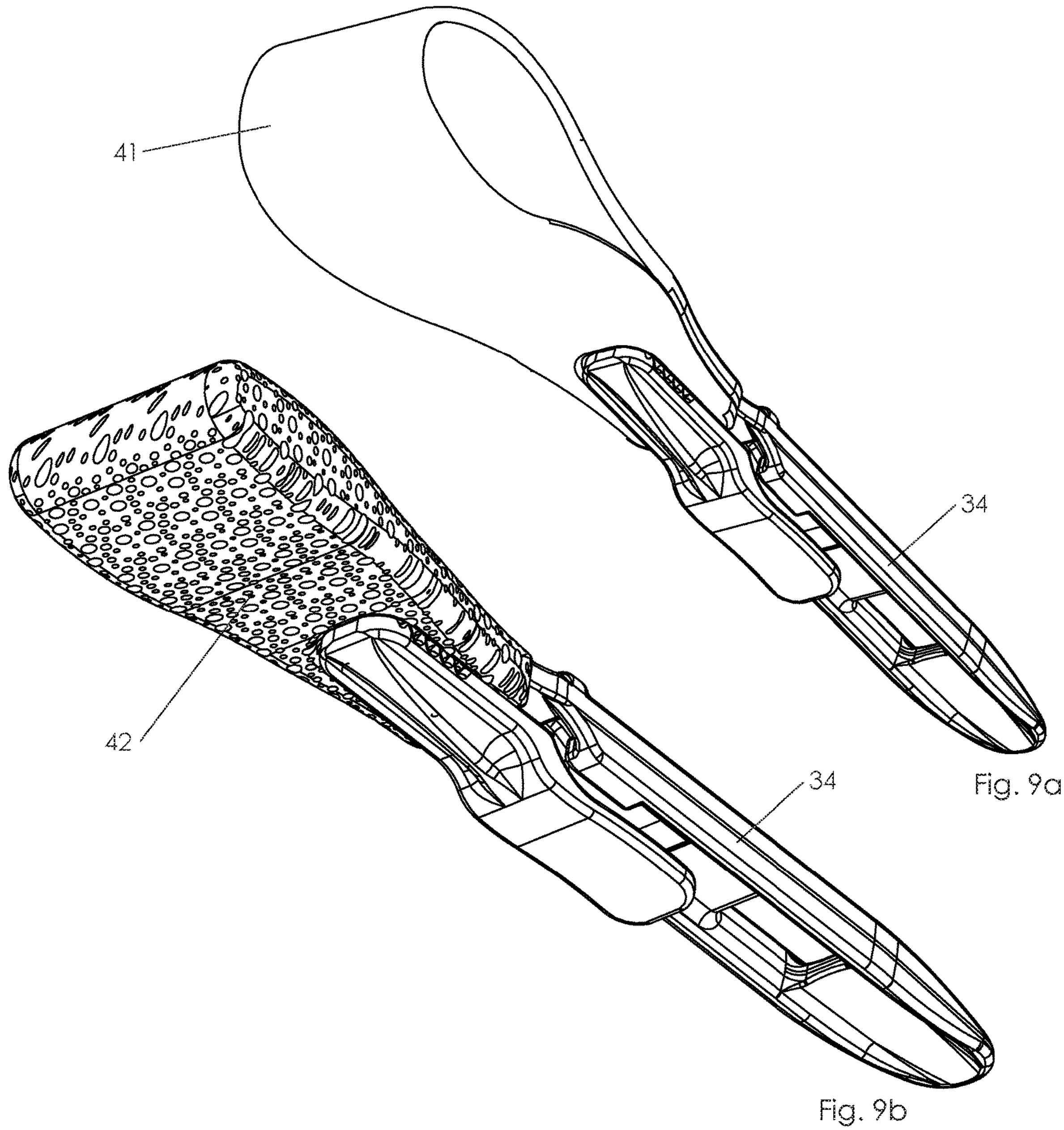
FIG. 9 shows the Alligator Clip assembly shown in FIG. 7, used for holding an absorbent swab (FIG. 9*a*) or a sponge (FIG. 9*b*). The swab or sponge can be used to remove a substance from a user, or may contain a quantity of, for example, an ointment for application to the user. The swab or sponge may represent any absorptive material such as cotton fibers, sponge, or similar washable or disposable material commonly used for such purposes.

FIG. 9—ALLIGATOR CLIP with SWAB or SPONGE

Figure 7B:
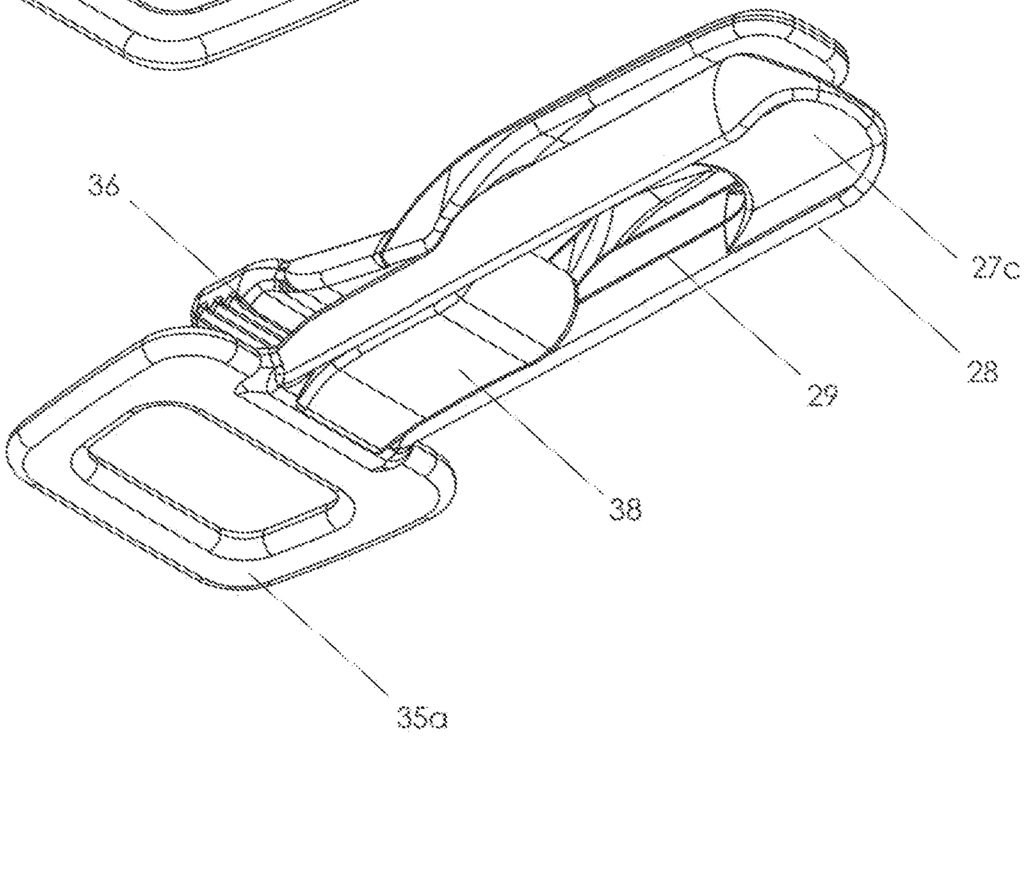
FIG. 7*b* is a bottom view of the embodiment shown in FIG. 7*a*.

FIG. 9a illustrates an Alligator Clip embodiment 34 holding an absorbent swab 41 or cloth, shown as a sheet of material that has been folded, and represents examples of differently shaped and sized items the Alligator Clip 34 could retain to provide a device and a method of applying medicines or cleansers. FIG. 9b illustrates the Alligator Clip 34 holding a sponge 42 for ointment or liquid solution. This swab or sponge comprises any one or more absorptive materials such as cotton fibers, sponge, hydrogel, or the like. The Swab 41 or Sponge 42 can be released from the Alligator Clip for cleaning or replacement by pressing the Clip Lever 37. The swab 41 or sponge 42 could be supported around a fixed surface to aid in user application by wrapping it around the fixed jaw with frame 35a (FIGS. 7a, 7b).

FIG. 10—MIRROR

Figure 10:
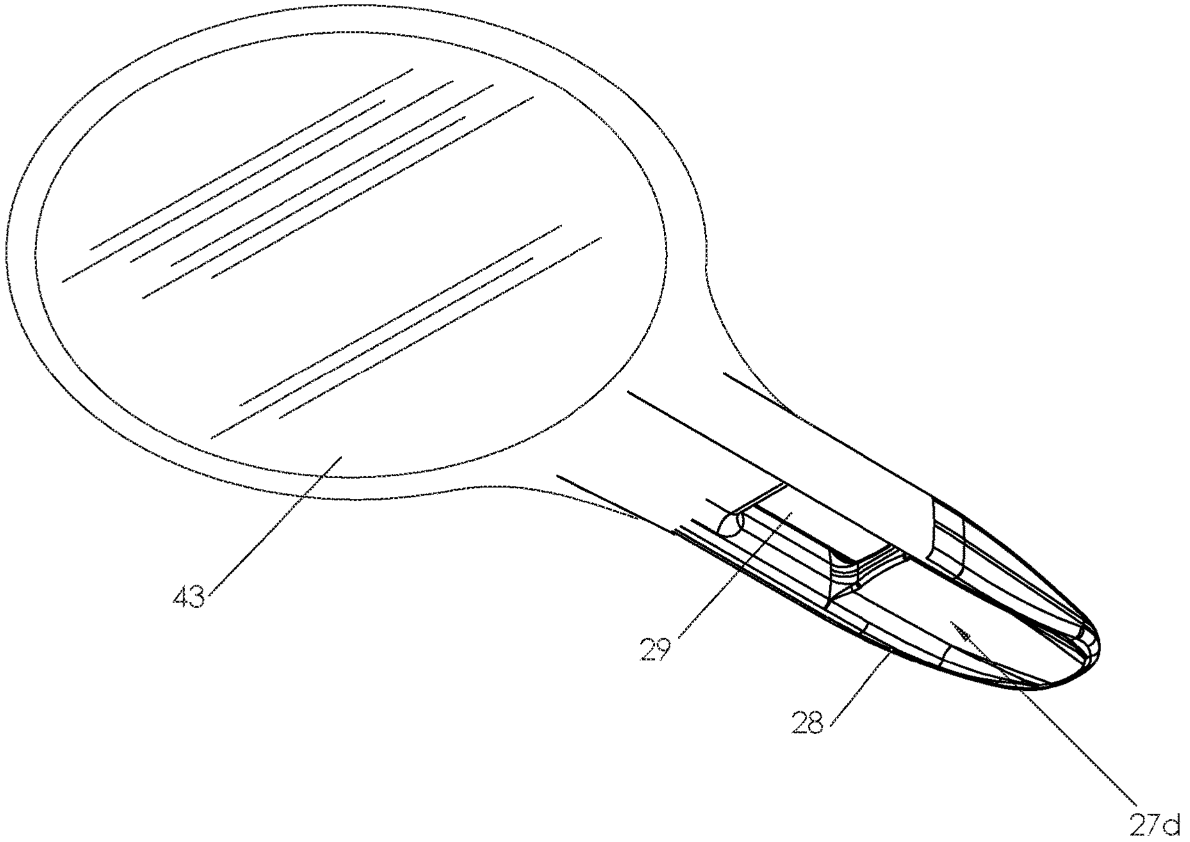
FIG. 10 shows a detachable head that comprises a mirror for viewing.

FIG. 10 shows a detachable head which incorporates a Mirror 43, having a reflective surface for viewing difficult to see areas on the operator's body. In this embodiment, the mirror housing incorporates Plug 27d as part of its construction. As with the other embodiments incorporating the features of Detachable Head Plug 27, Plug 27d is attached to the Connector 24 utilizing the Male Plug Rails 28 and Lock Hole 29. This is only one embodiment of the Mirror 43, and other versions could offer differently shaped and sized mirror configurations.

FIG. 11—RAZOR

Figure 11:
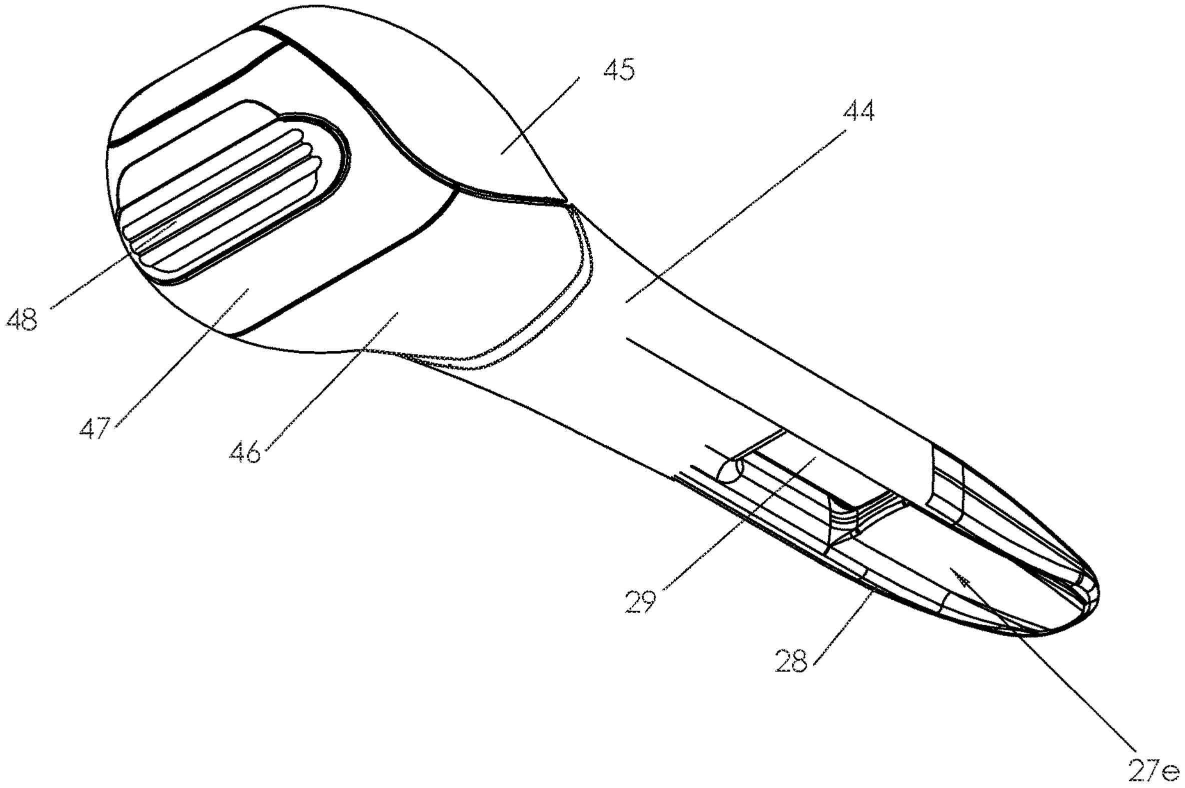
FIG. 11 shows an alternate embodiment of a detachable head that can be used for shaving.
Figure 11A:
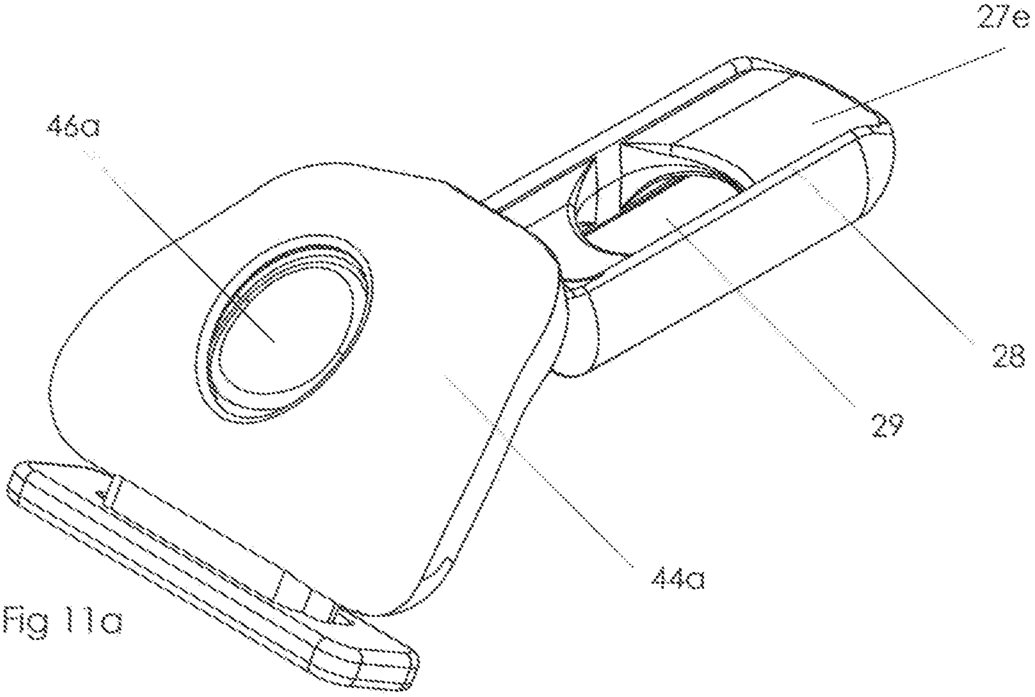
FIGS. 11*a* and 11*b* show top and bottom views, respectively, of a razor assembly embodiment.
Figure 11B:
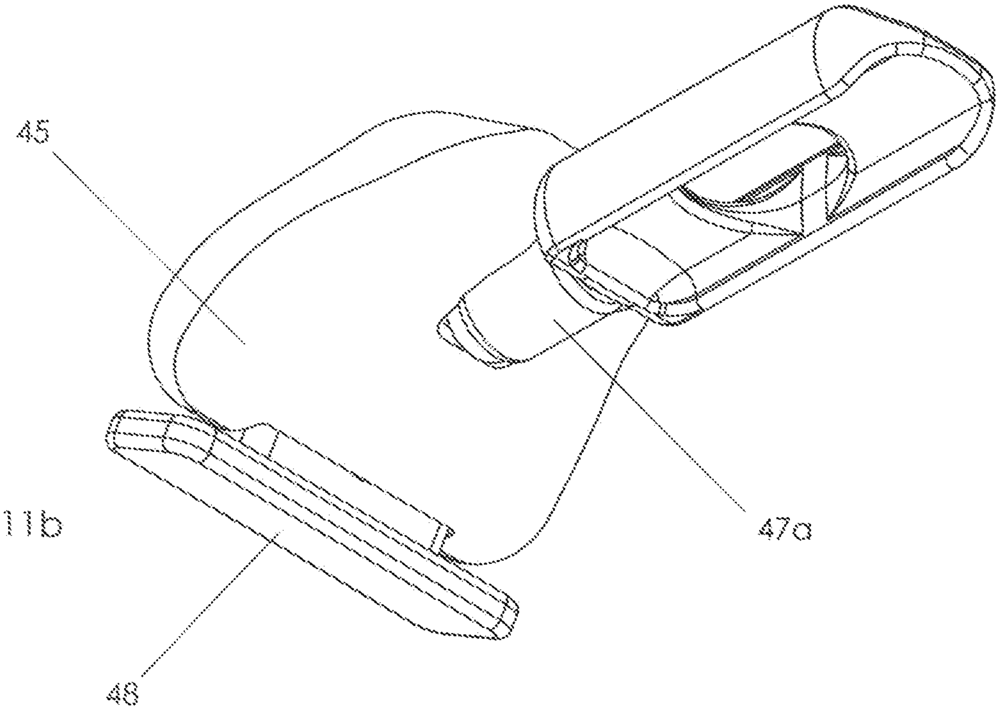

FIGS. 11 and 11a are two of many potential embodiments of razor assemblies 44 and 44a with a detachable head attachment that performs a shaving function. Razor assembly 44 comprises a Razor Head Body 45, a Cartridge Holder 46, a Cartridge Clamp 47 and a replaceable Razor Cartridge 48. The Razor Head Body 45 may be made of plastic or other suitable material, and of the size and contour to be hand-held to assist the forces and motions provided by the Wand 16 of FIGS. 1, 2, and 3. The features and shape of the disposable or replaceable Razor Cartridge 48 will define the means of securing it within the Razor Head Body 45 using a Cartridge Holder 46 and a Cartridge Clamp 47. The Razor Cartridge 48 is detachably mounted into and released from between the Cartridge Holder 46 and the Cartridge Clamp 47 for renewal by one or more release mechanisms, such as a button (or lever) 46a (shown in embodiment 44a, FIG. 11a). For improved usage experience to allow the Razor Cartridge 48 to follow the contour of the operator's skin surface, the Cartridge Holder 46 may have provision to rotate on the central axis pivot 47a (see embodiment 44a, FIG. 11b) of the Razor Head Body 45 in a limited angle of movement. The Razor Cartridge 48 may have provision to pivot in a limited angle of movement on an axis parallel to the skin surface and perpendicular to the possible Cartridge Holder 46 axis rotation. As with the other embodiments incorporating the features of Detachable Head Plug 27, the Razor Head Body 45, Plug 27e is attached to the Connector 24 utilizing the Male Plug Rails 28 and Lock Hole 29.

OPERATION—REFERENCE FIG. 1 and FIG. 4

In operation, a Detachable Head Plug 27 of choice is locked into place by inserting the Male Plug Rails into the Female Receptacle 25 in Connector 24. Specifically, this brings together the Male Plug Rails 28 and the Female Receptacle 25, whereupon the engagement of Release Button 26 into Lock Hole 29 to removably hold the Detachable Head Plug 27 into the Connector 24 with adequate retaining force for operation of the present invention using slow to rapid movements against the operator's body. Once a Detachable Head Plug 27 is attached to the Connector 24 in this manner, the operator bends the Wand 16 to the desired shape for whatever the desired procedure or function will be. If the use of a swab or cloth or wipe is desired, it would be attached to head Alligator Clip Assembly 34, as required. Once bent into position, the wand 16 retains its new shape and the position of the Detachable Head Plug 27 with respect to the Handle 10 is established. At this point the person performs the desired operation for as long as necessary to achieve the hoped-for result. To remove the head from the wand, the operator reverses the action of separating items Detachable Head Plug 27 and Connector 24. Pressing the Release Button 26 reduces the attachment and detachment pressing/pulling force to effectively zero, to facilitate removal of the Detachable Head Plug 27 from the Connector 24.

The apparatus can be cleaned with the appropriate cleansing solution and method and hung to dry via the Lanyard 14. If it's kept in an opportune proximity, the flexible, bendable reaching device of the present invention can be put back into use in a moment's notice, again stroking and scratching to perfection in a way no other product on the market can reasonably achieve.

Although embodiments of this invention have been described with a certain degree of particularity, it is to be understood that the present disclosure has been made only by the way of illustration, and that numerous changes in construction and arrangement of parts may be resorted to without departing from the spirit and scope of the invention.

CONCLUSIONS, RAMIFICATIONS, SCOPE

Once on the market, this device will rapidly gain notoriety and vast reputation as an instrument of well-being, of medicine, of cleansing, of personal hygiene, maintenance, and care.

What is claimed is:

1. A multi-functional personal care device, the device comprising:

a handle;

a personal care attachment; and a flexible connecting member attached to the handle at one end of the connecting member, and a second end of the connecting member terminating in a means for releasably fastening the connecting member to the personal care attachment;

the handle further comprising a grip surface and an opening, the grip surface being proximate where the handle is joined to the connecting member, and the opening is proximate an end of the handle not joined to the connecting member; and wherein the means for releasably fastening the connecting member is a connector; wherein the connector comprises a base, the base having an aperture therethrough, a pair of sidewalls attached to the base, the sidewalls connected at one end by an arcuate member, the arcuate member being attached to the connecting member, the base further comprising a connector release mechanism therein, the connector release mechanism extending through the base aperture, and the sidewalls each having an upper region, the upper region of one sidewall extending inward and toward the upper region of the other sidewall, the upper regions extending over the base to form guide rails for retaining a pair of walls of a plug from the personal care attachment.

2. The personal care device as described in claim 1, wherein the personal care attachment is a scratching device, the scratching device comprising a scratching device base, a plurality of bristles attached to the scratching device base, the scratching device base including an opening therein, the scratching device base opening for receiving the connector release mechanism of the connector, and the scratching device base terminates in the plug that is shaped to be receivable in the connector.

3. The personal care device as described in claim 2, wherein the plug further comprises the pair of walls attached to the scratching device base, the walls each having an upper portion that defines a plug rail, the walls being tapered towards the end of the scratching device base distal from the bristles, and when the scratching device is inserted into the connector, the plug rails are received beneath the guide rails, and the connector release mechanism is received within the scratching device base opening, retaining the scratching device within the connector.

4. The personal care device as described in claim 2, wherein the scratching device base further comprises a top surface and a bottom surface, and the bristles penetrate the top and bottom surfaces of the scratching device base, and the scratching device base being flexible.

5. The personal care device as described in claim 4, wherein the bristles are positioned in the scratching device base at an angle ranging from about 1 degree to about 90 degrees in relationship to the scratching device base.

6. The personal care device as described in claim 5, wherein the bristles extending from the top surface are positioned in the scratching device base at an angle ranging from about 1 degree to about 90 degrees in relationship to the scratching device base, and wherein the bristles extending from the bottom surface are positioned in the scratching device base at an angle ranging from about 1 degree to about 90 degrees in relationship to the scratching device base, whereby when the scratching device is rotated, the bristles will contact the skin of a user at the same angle.

7. The personal care device as described in claim 2, wherein the plurality of bristles include short bristles and long bristles.

8. The personal care device as described in claim 2, wherein each of the plurality of bristles has a hardness, and the plurality of bristles further comprises a plurality of bristles with different hardnesses.

9. The personal care device as described in claim 2, wherein each of the plurality of bristles includes a rounded tip.

10. The personal care device as described in claim 2, wherein each of the plurality of bristles terminate with an angled end.

11. The personal care device as described in claim 2, wherein the personal care attachment comprises the plurality of bristles, the plurality of bristles further comprises one or more of a plurality of long bristles, a plurality of short bristles, a plurality of bristles whose end terminates in a rounded cap, a plurality of bristles with an angled end, a plurality of soft bristles, and a plurality of hard bristles.

12. The personal care device as described in claim 1, wherein the plug of the personal care attachment further comprises an accessory receiving member, the accessory receiving member being an alligator clip.

13. The personal care device as described in claim 12, wherein the alligator clip comprises an upper jaw mechanism and a lower jaw mechanism, and the lower jaw mechanism further comprises a support frame extending from the lower jaw mechanism.

14. A multi-functional personal care device, the device comprising:

a handle, the handle comprising a grip surface, the grip surface being proximate where the handle is joined to a connecting member;

a personal care attachment, wherein the personal care attachment is a scratching device; and a flexible connecting member attached to the handle at one end of the connecting member, and a second end of the connecting member terminating in a means for releasably fastening the connecting member to the personal care attachment, the connecting member comprising a core member and a cover, the core member comprising one or more of the group consisting of a metallic rod, a metallic wire, a plastic rod, a cable, a plastic cable, a plurality of wires and a plurality of cables, the cover encloses the core member; and wherein the means for releasably fastening the connecting member is a connector, the connector comprising a base, the base having an aperture therethrough, a pair of sidewalls attached to the base, the sidewalls connected at one end by an arcuate member, the arcuate member being attached to the connecting member, the base further comprising a connector release mechanism therein, the connector release mechanism extending through the base aperture, and the sidewalls each having an upper region, the upper region of one sidewall extending inward and toward the upper region of the other sidewall, the upper regions extending over the base to form guide rails for retaining a pair of walls of a plug from the personal care attachment; and the plug further comprises the pair of walls attached to a scratching device base, the walls each having an upper portion that defines a plug rail, the walls being tapered towards the end of the scratching device base distal from a plurality of bristles, and when the scratching device is inserted into the connector, the plug rails are received beneath the guide rails, and the release mechanism is received within the scratching device base opening, retaining the scratching device within the connector.

* * * * *